United States Patent [19]
Haffner et al.

[11] 3,918,240
[45] Nov. 11, 1975

[54] HYDRAULIC SYSTEM FOR A GANG LAWN MOWER

[75] Inventors: Donald G. Haffner, Glendale; Dean A. Meyer, Caledonia; Franklin A. Ecker; Sahag C. Akgulian, both of Racine, all of Wis.

[73] Assignee: Jacobsen Manufacturing Company, Racine, Wis.

[22] Filed: Sept. 16, 1974

[21] Appl. No.: 506,261

[52] U.S. Cl. .................. 56/7; 56/10.9; 56/11.9
[51] Int. Cl.² .......................... A01D 35/24
[58] Field of Search . 56/7, 6, 11.9, 10.9, 13.5–13.8, 56/14.7

[56] References Cited
UNITED STATES PATENTS
3,511,034   5/1970   Strasel ............................. 56/7
3,563,011   2/1971   Bramley et al. ................... 56/7

*Primary Examiner*—J. N. Eskovitz
*Attorney, Agent, or Firm*—Arthur J. Hansmann

[57] ABSTRACT

A hydraulic system for a gang lawn mower of the type including a tractor having a hydraulic pump and valve and motors for driving the tractor. A plurality of lawn mowers are mounted on the tractor and include cutters, and hydraulic motors drive the cutters. The pump and the valve have separate sections for operating the respective motors, and the valve has spools which can be placed in various positions for operating the motors, and there is a single control assembly for positioning the spools to achieve operational position of the motors, including traction drive of the tractor at different speeds. Hand levers and foot pedals are utilized for controlling the valve and the motors, and a lockout mechanism operates to preclude positioning of the valve in certain positions and thereby preclude placing the tractor in the transport mode when the mowers are operating, and vice versa. The mowers are pivotally mounted on the tractor and may be raised and lowered through lifting cylinders connected to respective ones of said mowers, and a hydraulic sequencing valve permits raising and lowering of the mowers in sequence to assure proper mowing action.

20 Claims, 6 Drawing Figures

HYDRAULIC SYSTEM FOR A GANG LAWN MOWER

This invention relates to a hydraulic system for a gang mower, and, more particularly, it relates to a hydraulic system for powering a tractor and a plurality of lawn mowers, and the system includes a hydraulic pump and a hydraulic valve which directs hydraulic fluid to various motors for driving of the tractor or for driving of the mowers and for raising and lowering the mowers.

BACKGROUND OF THE INVENTION

The prior art is already aware of the provision of gangs of lawn mowers on tractors which are powered for driving the tractor and for driving the mowers also. Such prior art gang lawn mowers include a driving tractor with a plurality of driven mowers supported thereon for raising and lowering the mowers. For example, U.S. Pat. No. 3,511,034 discloses a tractor with a gang of lawn mowers mounted on the tractor, and the machine includes a hydraulic system having hydraulic motors for rotating the mower cutters, and the mowers are also pivotally mounted on the tractor and are under the influence of a lifting cylinder for raising and lowering the mowers. Still further, the said patent discloses mechanism for raising and lowering the mowers in sequence so that the forwardly located mowers may be lowered at a time when they reach the grass to be mowed, and then the rearwardly located mowers may be lowered at a later time when they reach the grass to be mowed, all in consideration of the forward movement of the tractor toward the grass being mowed. Additional examples of prior art gang lawn mowers with hydraulic systems are disclosed in U.S. Pat. No. 2,953,164 and 3,563,012. Still further, the prior art is already aware of various hydraulic valves and complete systems for operating hydraulic motors, lift cylinders, and the like, and such operations being accomplished in selective individual action and in sequence and also in combined actions of directing the output of two pumps to either two individual motors or to only one of the two motors, and such prior art examples are found in U.S. Pat. Nos. 3,208,221 and 3,744,522.

The present invention pertains to a hydraulic system in a mowing machine wherein the system is generally an improvement upon the prior art, including those mentioned above. That is, the present invention provides a hydraulic system wherein the engine powers a pump having a plurality of sections for driving various hydraulic motors, and there is a hydraulic valve having respective sections for directing the output of the pump to one or more of the motors. Accordingly, a pump which is utilized for driving a mower motor can have its output diverted for driving the traction motor of the tractor, and thus the tractor can be conveniently and economically driven at various powers and speeds of say either a mowing speed or one or more so-called traction speeds, depending upon the setting of the control levers and foot pedals and the like for controlling the pump output.

Another object and advantage of the present invention, compared to the prior art, is to accomplish the arrangement of a hydraulic system for traction powering the tractor and for powering the lawn mowers, and to have a lockout mechanism wherein the mowers cannot be operated when the tractor is in the transport mode, and likewise the tractor cannot be placed in the transport mode when the mowers are in the lowered and operating positions.

Another object and advantage of this invention is to improve upon the prior art by providing a hydraulic system for a mowing machine wherein the mowers are disposed in a forwardly located group and a rearwardly located group on the tractor, and the respective groups are under the influence of respective lifting cylinders, and there is a hydraulic sequencing valve which operates to raise and lower the two groups in a sequence such that the front mowers lower onto the grass as the mower approaches and sequentially the rear group lowers onto the grass at the same line where the front group was lowered. Conversely, the front group is first raised as the machine leaves the grass being mowed, and the rear group is sequentially raised at the same line where the front group was raised. With this arrangement, the grass is mowed in a manner to eliminate any uncut grass when entering or leaving a patch of grass, such as a golf course green or the like.

Still further, it is an object and advantage of this invention, compared to the prior art, to provide a mowing machine with a hydraulic system which has a traction drive arrangement for the tractor and which has a mower raising and lowering arrangement and a mower cutter driving arrangement, and the various arrangements are under the influence of a lockout mechanism which causes them to be mutually exclusively operable, such that one arrangement or unit will not operate when the other is in a certain operating mode. That is, the drive units for the tractor cannot be changed to the tractor transport position when the mowers are in their lowered positions and are operating; conversely, the mowers cannot be lowered and operated while the tractor is in the transport position.

Summarizing some of the aforementioned, the present invention provides a hydraulic system for a gang mowing machine wherein a pump has a plurality of pump sections and a valve has a plurality of sections for directing the output of the pump to various hydraulic motors for accomplishing the tractor mowing speed and two transport speeds and a tractor reverse speed, plus a neutral mode, all accomplished through the use of a single control lever and the use of a compact pump and a compact valve with their respective sections. Further, there is independent operation of each one of the plurality of mowers, and there is also sequential raising and lowering of the forwardly and rearwardly located mowers. Still further, there is the lockout mechanism for precluding undesirable traction operation of the tractor or mowing operation of the mowers, at certain times as mentioned above. The mutliplicity of these aforementioned functions is achievable through a minimum number of controls, including a single type of control for the several speeds of the tractor, and including hand controls and foot controls, for respective operation of the mower motors and for raising and lowering the mowers.

Other objects and advantages have become apparent upon reading the following description in light of the accompanying drawings.

BRIEF DESCRIPTION OF THE DRAWINGS

FIG. 5 is an enlarged top plan view of a fragment of the control panel of the tractor shown in FIG. 1.

DETAILED DESCRIPTION OF THE PREFERRED EMBODIMENT

Figure 1:
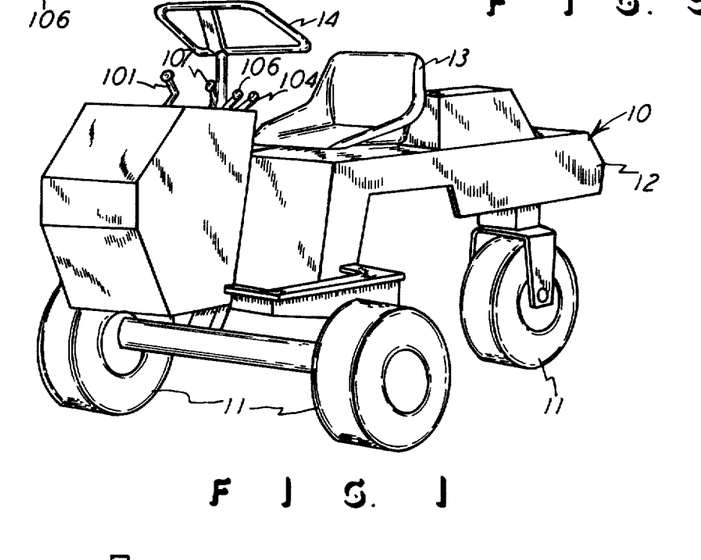
FIG. 1 is a front perspective view of a tractor which is useful in supporting the mowers incorporated in the machine of this invention.
Figure 2:
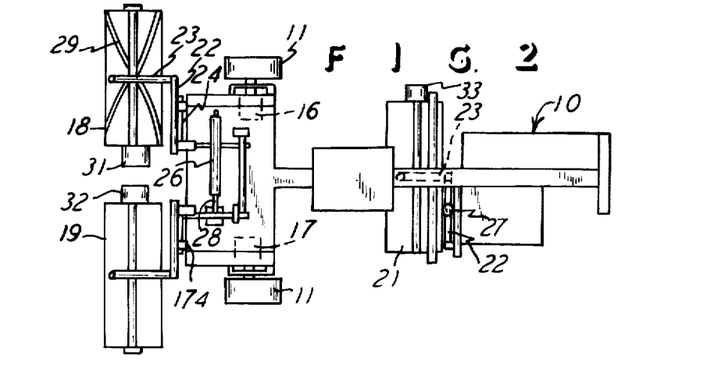
FIG. 2 is a diagrammatic top plan view of the tractor shown in FIG. 1, on a reduced scale, and with three reel-type mowers mounted thereon.

FIGS. 1 and 2 show a tractor 10 having ground engaging wheels 11 and a body or frame portion 12 and an operator's seat 13 and a steering wheel 14. The tractor may be of any conventional arrangement, and it is suitably powered by a gasoline engine, or any other prime mover, and the front wheels 11 are driven by hydraulic motors 16 and 17 for traction drive of the tractor in a conventional manner and arrangement. Also, a plurality of lawn mowers such as the reel-type of mowers 18, 19, and 21 are pivotally mounted on the tractor and can be raised and lowered between inoperative positions and lowered ground engaging positions for mowing. The mowers are thus conventionally pivotally mounted on the tractor 10 through mounting members and arms 22 and 23, and mower lift mechanisms 24 are under the influence of hydraulic cylinders 26 and 27 for pivoting the arms 22 up and down in the raising and lowering of the mowers, in a conventional manner. That is, the hydraulic cylinders 26 and 27 are respectively shown in FIG. 2 in their side view and their end view, and the cylinders 26 and 27 are suitably pivotally mounted on the tractor 10 and the front cylinder 26 has its piston rod 28 suitably engaged with the lift mechanisms 24, for actuating the arms 22 in the raising and lowering of the front mowers 18 and 19, and the rear cylinder 27 is connected to the rear mower arm 22, for raising and lowering the rear mower 21. The mowers are of the reel-type having the cutters 29, and hydraulic motors 31, 32, and 33 are repectively mounted on each of the three mowers and are in driving relation with the respective cutters 29 on each of the three mowers, in a conventional arrangement.

Figure 6:
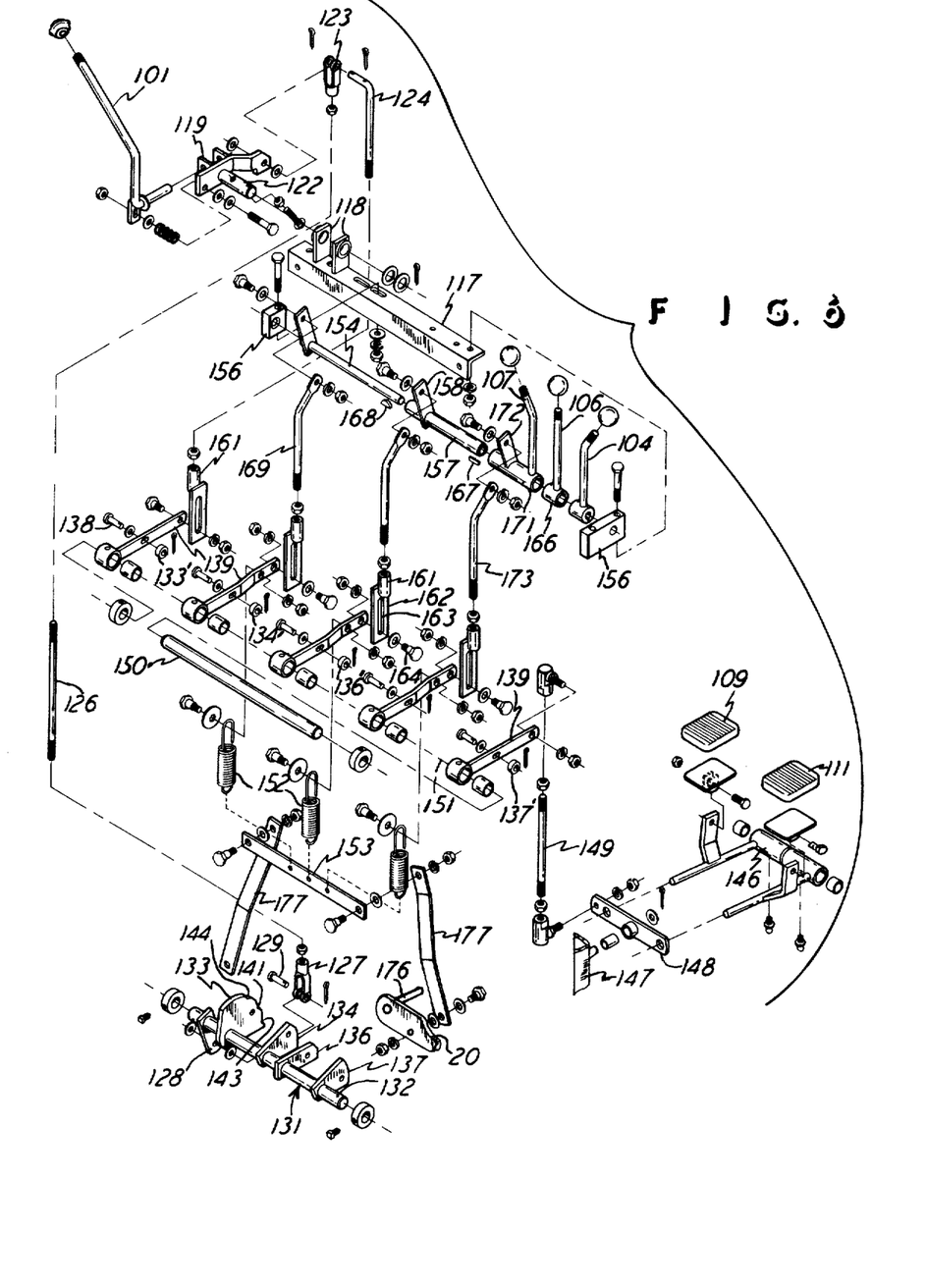
FIG. 6 is an exploded view of the controls and the supporting and attending mechanism for a portion of the hydraulic system of this invention.

The description of the aforementioned machine is that of a conventional gang lawn mowing machine having a tractor with a plurality of mowers pivotally mounted thereon and with a hydraulic system for powering both the tractor and the cutters of the mowers, and with the mowers being under the influence of hydraulic cylinders for raising and lowering the mowers, all in the conventional manner. Further, to the extent necessary for disclosing the arrangement to one skilled in the art, reference is had to U.S. Pat. No. 3,563,012 which is incorporated herewith in the drawings and description therein. In said patent, and in the present invention, the gang mowing machine is particularly suitable for mowing golf course greens, and thus the actions of machine transport and mowing speeds and the raising and lowering of the mowers, and like actions are particularly significant. Additionally, U.S. Pat. No. 3,563,012 shows a front lift cylinder designated 97, and that cylinder is comparable to the cylinder 26 of FIG. 2 herein, and the said patent also shows mower lift cams designated 113 and 127, and such showings being in FIGS. 5 and 6 of said patent, and those lift cams, and roller followers, are utilized in FIG. 2 of this invention and in the mounting of the front mowers 18 and 19, and one such cam 20 is shown in FIG. 6. Similarly, FIGS. 4 and 7 of said U.S. Pat. No. 3,563,012 show an arrangement for pivotally mounting the rear mower, which is mower 21 in the present invention which can utilize the arrangement in said patent.

Figure 3:
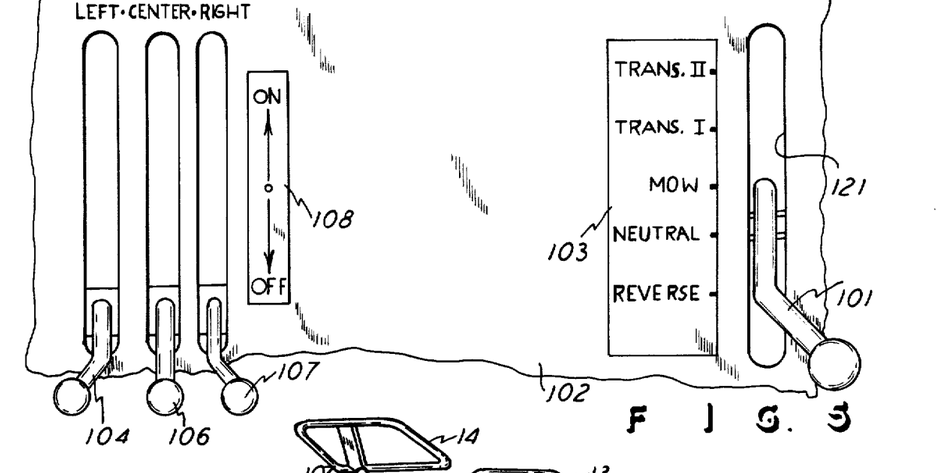
FIG. 3 is a schematic view of the hydraulic components incorporated in the machine shown in FIG. 2.

Accordingly, the present invention is directed at the hydraulic system for the features of powering the tractor, powering the mowers, raising and lowering the mowers, and like functional purposes. Therefore, the present description is directed at the hydraulic system and is shown in FIG. 3 to display the tractor left-hand traction motor 17 and right-hand traction motor 16, which motors are suitably drivingly connected to the tractor front wheels 11, in any conventional arrangement. FIG. 3 further shows the left and right-hand front mower motors 32 and 31 respectively and it shows the rear mower hydraulic motor 33. Additionally, FIG. 3 shows the front lift cylinder 26 and the rear lift cylinder 27, and it will here be seen that the cylinders 26 and 27 have mounting ends 34 and 36, respectively, for suitably pivotally mounting the cylinders on the tractor, in any conventional arrangement, and thus the cylinder rods 37 extend to engage the mounting and pivot arms for the respective mowers, as described and as shown in the aforesaid reference patent. FIG. 3 further shows a hydraulic reservoir 38 and a four-section pump 39 and a multi-section five spool valve 41. There is also a hydraulic sequencing valve 42 and a conventional filter 43, and of course the hydraulic mechanism and system shown in FIG. 3 is connected together by and includes a plurality of hydraulic lines 44 which will be readily understood by one skilled in the art and which may be either flexible or rigid lines, depending upon their particular use and may therefore be hoses or pipes, and these lines are of type therefore shown in U.S. Pat. No. 3,563,012.

It will of course be understood that the pump 39 is driven from the power of the tractor 10, such as off the conventional gasoline engine or other prime mover utilized for driving the tractor 10, and the pump is connected to the valve 41 which in turn distributes the hydraulic flow and pressure to the three mower motors and to the two tractor traction motors, all as shown by the hydraulic disclosure of FIG. 3. Speaking somewhat generally, the pump 39 has one output section 46 which connects through a line 44 to a valve section 47. The valve 41 can be set in a position to direct the pump output at section 46 to a hydraulic connection at 48 which in turn connects to the traction motors 16 and 17 for driving the latter in the forward drive position. A hydraulic connection 49 connects to the hydraulic hose or line 44 connected to the motors 16 and 17 for returning the hydraulic flow to the valve connection at 51 which in turn returns the hydraulic flow to the line connected at the hydraulic connection 52. The hydraulic fluid can then flow through the filter 43 and back to the tank or reservoir 38, and it will be further seen that the pump 39 is connected to the reservoir 38 through connections 53, in a conventional arrangement of diagramatically showing the hydraulic system as will be understood by one skilled in the art.

The aforementioned thus describes the hydraulic arrangement and system for powering the tractor traction motors 16 and 17 in the mowing mode. In that mode, the mower motors 31, 32, and 33 can also be powered by the pump 39 which has the three sections designated 54, 56, and 57 for respectively driving the mower motors 31, 33, and 32. That is, the pump section 54 connects to the valve section 58, and the valve 41 has a section 59 which has its line 44 connecting to the motor 31. Likewise, the pump section 57 connects to the valve section 61 which, through a connection 62, connects to the motor 33. Finally, the pump section 56 connects to the valve section 63 which in turn has a connection 64 which connects, through its hose 44, to the motor 32. Additionally, one skilled in the art will readily see that the motors 31 and 32 have a connection at 66 for return flow to the reservoir 38, and the motor 33 has its return flow connected at the connector 52.

The hydraulic system is arranged so that, when the tractor is to be driven at a faster speed and this would be a first transport speed compared to the mowing speed, then the mower pump section 56 is directed through the valve 41 for powering the traction motors 16 and 17. Additionally, when a still faster traction speed is desired, and this is when the mowers are not operating just as they are not operating in the first traction speed mentioned, then, the pump section 57 is, in addition to the section 56, also directed to the traction motors 16 and 17.

Figure 4:
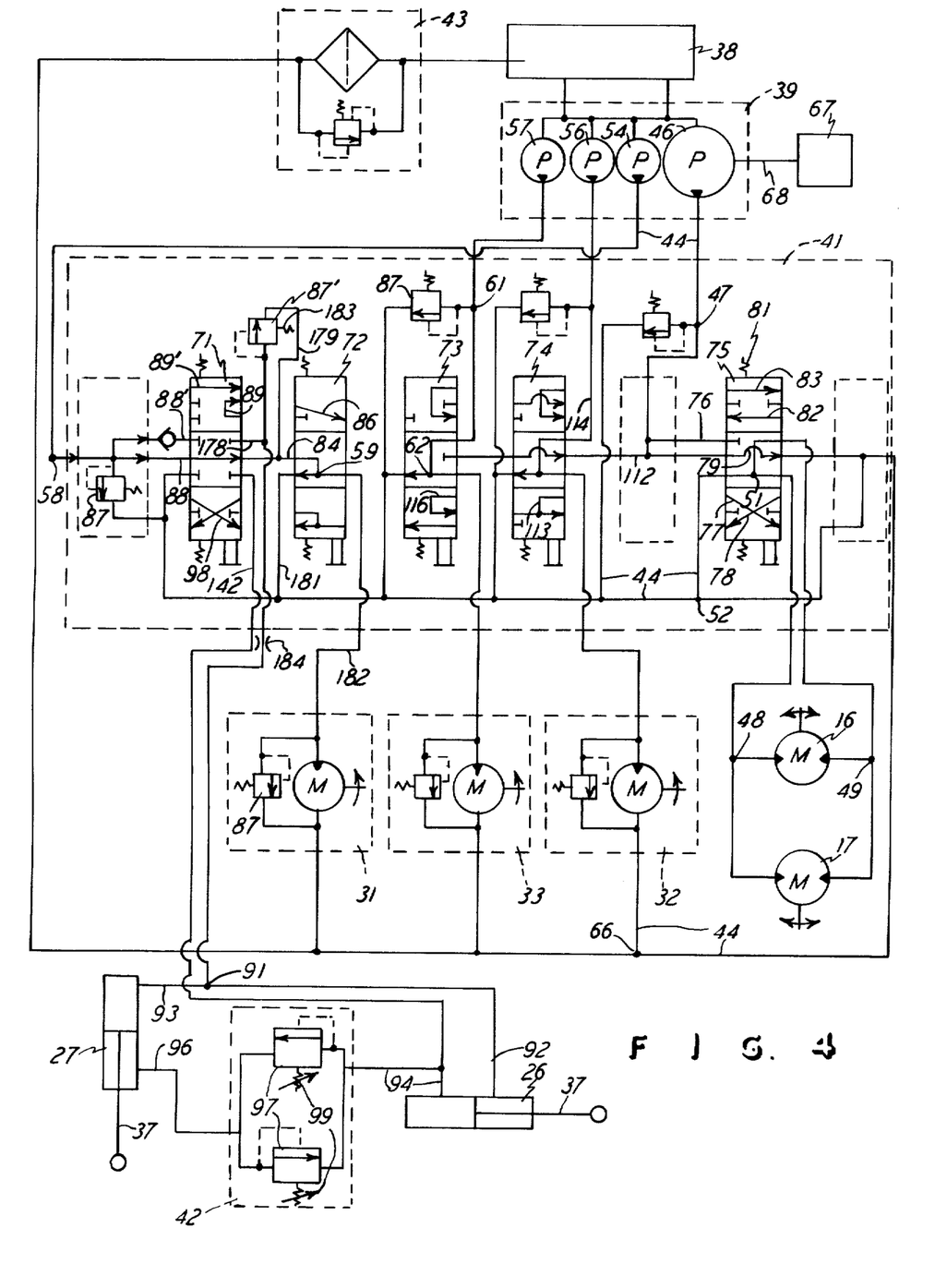
FIG. 4 is a schematic view of the hydraulic system utilized in this invention.

FIG. 4 shows the hydraulic schematic view of the hydraulic system, and one skilled in the art can trace the flow of hydraulic pressure and understand the structure and its function, as previously mentioned in several places above. Thus, the pump 39, the valve 41, and the five hydraulic motors and the two lift cylinders are all shown in FIG. 4. Here it will be seen that the pump 39 has its several sections 46, 54, 56, and 57, and it will also be indicated that the pump 39 is driven by an engine of the tractor and diagramatically shown and designated 67 which is connected to the pump 39 through a drive shaft designated 68. FIGS. 3 and 4 also show that the valve 41 has five spools 71, 72, 73, 74, and 75. These spools are of course axially movable within the respective five sections of the valve 41 for diverting the output of the pump 39 to the various and respective five motors disclosed and also to the cylinders 26 and 27. Thus, it will be seen and understood that the pump output section 46 is controlled by the spool 75 such that the valve 41 has a hydraulic port 76 connected with the hydraulic line 44 from the pump section 46, and upward movement of the spool 75, as seen in FIG. 4, will cause the spool valve passageway 77 to communicate the port 76 with the connector 48 for driving the traction motors 16 and 17 in the forward direction. With the description and with the showing in FIG. 4, one skilled in the art can readily understand and trace the return flow of fluid from the motors 16 and 17 and through the connector 49 and through the several hoses 44 and to the filter 43 and ultimately back to the reservoir or tank 38. Such return flow is made through the spool fluid passageway 78. Of course the spool 75 is shown in FIG. 4 in the neutral or inoperative position where the flow goes from the pump section 46 and through the spool centrally shown passageway 79 and then back to the tank 38. Further, the spools, such as the spool 75 are shown to have centering springs 81 for achieving the neutral position.

Movement of the spool 75 in a downward position, as seen in FIG. 4, will cause the lines to the traction motors 16 and 17 to have reverse flow, by virtue of the passageways 82 and 83 in the spool 75, and thus the entire machine can be driven in a reverse or backing direction.

The hydraulic system and arrangement for driving the mower motors 31, 32, and 33 can also be seen and understood by FIG. 4, and here it will be seen that when the spool 72 is moved downwardly, as viewed in FIG. 4, then the valve port 84 is aligned with the spool passageway 86 to direct the flow to the forward right-hand mower motor 31. Thus, the pump section 54 is then powering the motor 31. Likewise, downward movement of spools 73 and 74 will respectively connect pump sections 57 and 56 to mower motors 33 and 32, respectively.

It will be further seen and understood that the valve 41, and the three mower motors all have safety valves designated 87 for relief of excessive hydraulic pressure, for instance if in the event the mower cutters engage an obstacle.

As will further be seen and understood with reference to FIGS. 3 and 4, the pump section 54, through the spool 71, connects to the raising and lowering cylinders 26 and 27. Thus, moving the spool 71, downwardly, as viewed in FIG. 4, will cause the valve port 88' to connect with the spool passageway 89' which in turn leads to the connection 91 for the cylinders 26 and 27. The cylinder 26 receives hydraulic pressure through the line 92 connected with the rod end of the cylinder 26, and the line 93 extends from the connection 91 to the base end of the cylinder 27. Thus, the cylinder 26 is contracted for lowering the mowers, and the cylinder 27 is extended for lowering the mowers, all in keeping with the pivotal mounting and arrangement of the mowers as described in the aforementioned. However, the cylinders 26 and 27 are double-acting cylinders having respective lines 94 and 96 connected at the other ends of the cylinders, as shown in FIG. 4. Still further, the lines 94 and 96 connect to the sequence valve 42, so that the line 96 causes the return flow from the cylinder 27 to pass through the valve 42, but the valve 42 is of a nature such that it is normally closed until a minimum of hydraulic pressure is exerted on the valve 42. Such minimum pressure is created through the line 96 after the cylinder 26 has moved so that sufficient pressure exists in line 93 to create the pressure in line 96 for opening the valve 42 against the spring release member 97, and the valve 42 is of a conventional arrangement in its pressure and spring release. Therefore, the system is such that the cylinder 26 is first activated before there is a minimizing of pressure in the line 96 to thereby permit the cylinder 27 to operate. Accordingly, the front mowers 18 and 19 will lower first, under the control of first acting cylinder 26, and then the rear mower 21 will lower, under the control of the second acting cylinder 27. Conversely, setting of the spool 71 in the mower raising mode will cause the cylinder 26 to raise the front mowers before the rear mower is raised. This therefore permits an automatic lowering and raising of the mowers so that all mowers will commence and stop mowing action on the same line of grass, such as a golf course green in the approach and departure of the machine relative to the green. In the raising action, the spool 71 is moved upwardly, as shown in FIG. 4, and the spool passageway 98 then communicates with the valve port 88' to direct the fluid pressure to the line 94 of the cylinder 26 and thus extend the cylinder 26 for raising the front mowers. When the cylinder 26 is activated, then the line 94 creates pressure in the sequence valve 42 to cause the hydraulic pressure to overcome the yielding member 97 of the valve 42, in a conventional manner, and the fluid pressure then passes from the valve 42 to the line 96 to thereby contract the cylinder 27 and cause the rear mower to be raised.

With the system as described thus far, it will therefore be seen and understood that the valve 41 has several sections, defined by the spools described, and the valve has ports 76 and 84 and 88, and the like shown ports, and the spools 71 through 75 are closure members which have their respective fluid passageways, such as those enumerated as 77, 78, 82, 86, 89, and the like.

FIG. 4 further shows how downward movement of the respective spools 73 and 74 will cause their shown spool passageways to fluid flow communicate with the valve ports for directing the output of the pump sections 57 and 56, respectively, to the motors 33 and 32 respectively.

Another feature of the hydraulic system is the utilization of the output of pump sections 56 and 57 in the traction drive of the tractor 10. That is, upward movement of the spool 74 will divert the output of pump 56 to the traction motors 16 and 17, in addition to the output of the pump section 46, and thus the tractor is run at a so-called first transport speed which is faster than the mowing speed heretofore described and which is produced only by the pump section 46. Still further, a still faster and so-called second transport speed is achieved by upward movement of the spool 73 to divert the flow of pump section 57 to the traction members 16 and 17 and to thereby drive the tractor 10 at a still faster transport speed. Thus, with the hydraulic system shown and described, the tractor can be driven at a mowing speed and at a first transport speed and at a second transport speed, and the two transport speeds are achieved by utilization of the two pump sections, namely sections 56 and 57, which are also available for driving the mower motors 32 and 33. Likewise, the remaining pump section 54 is utilized for a dual purpose of driving the mower motor 31 and for powering the cylinders 26 and 27. Thus the hydraulic system is compact and versatile in achieving the several results described, including reverse drive of the tractor, but without adding additional pumps and connecting lines and separate motors for the various actions being described herein. In the system described, the spools 71 thru 75 are closures, and FIG. 3 shows the upper ends of the respective spools with their slots or openings for connections hereinafter described. The five spools and valve sections are all incorporated in one assembled valve 41, and also the four pump sections are incorporated and assembled in one pump 39. Still further, the sequence valve 42 has the two closures or yielding members 97 which respectively show directions of fluid flow depending upon the pressure in either the line 94 or the line 96, both lines being connected to the sequence valve 42. Both closures 97 have adjustable yielding springs 99 which permit setting the point at which the closures 97 will open for permitting the respective flow therethrough, and thus the timing between the action of the cylinders 26 and 27 can be adjusted to thereby adjust and control the timing of the raising and lowering of the front and rear mowers.

FIGS. 1, 5, and 6 show the several controls for the various spool sections 71 thru 75. Thus, a single lever 101 extends above the tractor cowling 102 ad is available to the operator's right hand for setting the lever 101 in the five different traction drive modes designated on the plate 103. Also, three levers 104, 106, and 107 are on the tractor and are available to the operator's left hand for moving fore-and-aft in the direction of the tractor, as is the lever 101, for placing the left, center, and right mower motors 32, 33, and 31, respectively, in either the on or off position, as designated by the indicator plate 108. Still further, FIG. 6 shows a foot pedal 109, which actually controls the cylinders 26 and 27 for lowering the mowers, and it shows a foot pedal 111, which controls the cylinders 26 and 27 for raising the mowers. Therefore, a plurality of hand-manipulatable controls, and two foot-manipulatable controle are provided on the tractor 10 for controlling the flow of fluid through the valve 41 to thereby achieve the functions heretofore described.

FIG. 4 shows that the pump 46 and its line 44 lead to connection 47 which in turn connects with the valve passage or port 112, as shown. Thus, when the spool 75 is in the neutral position, as shown, the output of the pump 46 flows through the closure passageway 79 and back to the tank 38, in the schematic shown in FIG. 4. However, when the spool 75 is shifted, up for forward traction drive and down for reverse traction drive of the tractor, then of course the output of pump 46 is directed to the traction motors 16 and 17, as described above. Likewise, the output of pumps 56 and 57 through the respective lines shown and connecting to respective spools 74 and 73 can be directed to the traction motors 16 and 17, for the first transport speed and the second transport speed, respectively. That is, spool 74 can shift up, as seen in FIG. 4, to cause its passageway 113 to connect with the line 114 and the valve port designated 112 to thereby direct the flow to the traction motors 16 and 17. Similarly, spool 73 can be shifted, as seen in FIG. 4, and its passageway 116 will then be in fluid flow communication with the valve port 112 to further direct the output of the additional pump 57 to the traction motors for achieving the maximum transport speed, as described. Also, when the output of pumps 56 and 57 is directed for transport action of the tractor, then the output of those pumps cannot be directed to the driving of the mower motors, and therefore the mowers cannot operate in transport, and that is desirable.

FIG. 6 shows the arrangement and mounting of the single lever assembly, which is under the influence of lever 101, and it shows the arrangement and mounting of the three other hand levers and the two foot pedals, as described. An angle member 117 is part of the tractor itself, and it provides a pivot mounting at 118 for an assembly 119 which receives the lever 101, as indicated in FIG. 6. Thus, the lever 101 can move in the fore-and-aft direction of the tractor, as seen with respect to the slot 121 in FIG. 5, as the lever pivots about the shown openings in the plates 118 and about the axis of the pin 122 which is pivotally disposed in the openings in the plates 118. The single lever assembly being described has a yoke 123 which is secured to the pivot assembly 119 through a reversing rod 124, and another rod 126 threads into the yoke 123 to extend therebelow and threadedly connect to another yoke 127 which in turn is attached to an arm 128 through a pin 129. The arm 128 is on a traction cam assembly, generally designated 131 and which is pivotally mounted on the tractor for pivot action about the axis of the shaft 132 of the assembly 131. Throughout this description, it will be apparent to one skilled in the art how the parts are assembled, and it is believed that the exploded view of FIG. 6 is the most descriptive way of showing the assembly of FIG. 6, and of course the dot-dash lines indicate the connections of the various parts shown in FIG. 6 and it will be apparent to one skilled in the art how the assembly is made and by what means, all as seen in FIG. 6.

The cam assembly 131 has affixed therein a traction cam 133 and the additional traction cams 134 and 136 and the mower raising and lowering cam 137. Of course the four cams shown and mentioned have their radially outer surfaces of a configuration suitable for operating the four of the five spools, namely spools 71, 73, 74 and 75. That is, there are four cam followers 133', 134', 136', and 137'. Those four cam followers are rollers which are in normal rolling contact with the radially outer edges of the respective cam followers shown in the assembly 131, and the rollers are pinned to the four respective spools described, by pins 138 which pass through an elongated slotted lever 139 which, also by means of pin 138, is pinned to the extending bifurcated ends of the spools as they are shown in FIG. 3. That is, the five levers 139 are respectively pinned to the bifurcated ends of the five spools 74 thru 75, and the four roller cam followers are connected with four of the five levers 139, as they are shown in FIG. 6. Further, the shown arrangement of the traction cam assembly 131 and the cam followers and the levers 139 is such that when the lever 101 is moved to its forward position for transport I, for instance, then the cam 133 has engaged the follower 133' to move the spool 75 upwardly, as seen in FIG. 4, for the first transport drive mode heretofore described in that mode, the output of pump 46 is applied to the traction motors 16 and 17, and the cam 133 has moved to a position where its radially outer surface at a detent 141 engages the roller 133' for positioning the spool 75. In that position of the traction cam assembly 131, the cam 134 has also rotated to where it displaces the roller follower 134' for moving the spool 74 upwardly, as seen in FIG. 4, to thereby apply the output of pump 56 to the traction motors 16 and 17 and thus achieve the first transport drive mode being described. At the same time, cam 137 has rotated to move spool 71 upwardly to thereby create pressure in the line designated 142 which is connected with the ends of cylinders 26 and 27 for raising the three mowers, as described above, and, therefore, the output of pump 54 which supplies spools 71 and 72 cannot be directed to the mower motor 31 and therefore the mower 18 cannot be operated when the tractor is in the transport mode. Likewise, cam 136 precludes operation of spool 73, and therefore the mower motor 33 cannot be operated and thus mower 21 cannot operate in the tractor transport mode, and of course, since the output of pump 56 has been diverted for driving the traction motors 16 and 17, mower motor 32 cannot operate and thus mower 19 is not operating in the transport mode.

Further rotation of the cam assembly 141, to where the detent 143 is positioned to receive roller 133' and thereby position spool 75 for the transport mode, causes the cam 136 to rotate to engage follower 136' for positioning spool 73 up, as viewed in FIG. 4, and thereby direct the output of pump 57 to the traction motors 16 and 17 for an additional transport speed or the transport II. Further, the cam 133 has a third detent 144 which receives roller 133' when the assembly 131 is in the mowing position, and that position for assembly 131 permits the other four spools to be operative for driving the respective motors and for raising and lowering the mowers, as will be seen and understood by the drawing FIG. 4. With the arrangement described, there is a lockout mechanism, namely the cams and cam followers, and the like described, which prevents the operation of the mower motors and prevents the lowering of the mowers when the tractor is in either transport drive mode. However, when the tractor is in the mowing mode, then the mower motors operate, and the mowers can also be raised and lowered. The arrangement is such that the converse is also true, that is, when the mowers are being operated, the single lever control cannot move the hydraulic system to either transport position described.

FIG. 6 therefore shows that the two foot pedals 109 and 111 are movably mounted on a pivot assembly 146 which is suitably supported on the tractor, such as by a tractor frame piece 147 and a pivot bar 148, all assembled as indicated in FIG. 6. Thus the bar 148 tips up and down at opposite ends, and a rod 149 is attached to one end of the bar 148, and thus the rod 149 moves up and down in response to depressing the respective pedals 109 and 111, and the upper end of the rod 149 is attached to one of the five links 139, for pivoting the latter about the pivot axis designated 151, and it thereby controls the cam follower 137' and thus controls the spool 71 which is the spool for raising and lowering the mowers, as previously described.

FIG. 6 therefore further shows that the levers 139 are pivotally mounted on a shaft 150 which is suitably supported on the tractor for receiving and pivotally mounting all of the five levers 139 in a manner indicated in FIG. 6. Further, three tension springs 152 attach to the central three levers 139 for urging the levers downwardly, and the springs are anchored by the tie-bar 153, and thus the three central levers 139 are urged downwardly, and these are the three levers which are related to the spools which direct the flow to the mower motors FIG. 6 further shows that the three hand levers 104, 106, and 107 are piloted on the lift shaft 154 which is rotatably mounted in bearing blocks 156 which are suitably mounted on the tractor in any conventional manner. The shaft 154 receives a sleeve member 157 which has an arm 158 connected to a lockout rod 159 which has its lower end threaded into a sleeve 161 affixed to a plate 162 having a lost-motion slot 163. In turn, a shouldered bolt 164 passes through the slot 163 and attaches to the end of the lever 139 and thus connects the lever 139 with the plate 162, but in a lost-motion connection. The sleeve 157 is rotatable on the shaft 154, and the sleeve portion 166 of lever 106 is rotatably affixed with the sleeve 157 by means of the key 167, and thus the lever 106 controls rotation of the sleeve 157 and in turn controls the rod 159 and the lever 139 which is attached to the spool 73. Similarly, the lever 104 is keyed to the shaft 154, by means of the key 168, and thus movement of lever 104 rotates shaft 154 and accordingly displaces the rod 169 which is related to spool 74. Finally, the lever 107 has its lower sleeve 171 carrying an arm 172 which in turn is pinned to the rod 173 which controls the lever 139 related to the spool 72. The connections between the hand-manipulatable levers 104, 106, and 107, and the lever 101 are such that movement of any one lever will not cause the other to move, and this is by virtue of the lost-motion slots 163, as shown. It will be further seen that the reversing rod 124 connects to the sleeve 161 for the end lever 139 which is related to the spool 75, and thus moving the lever 101 to the rearward position will move the spool 75 downwardly for reverse drive of the traction motors 16 and 17.

Referring again to the arrangement for raising and lowering the mowers, U.S. Pat. No. 3,563,012 shows the lift cams 113 and 127 and it further shows that these cams engage follower rollers 114 and 128, respectively, affixed to the pivot mower support arms, such as the arms 22 shown in FIG. 2 of the present drawings. Therefore, the present drawings also show the cam follower rollers 174, and FIG. 6 shows the cam 20, as previously mentioned, and the machine would have the two cams 20 disposed underneath the two cam followers 174 for raising and lowering the front mower pivot arms 22. The cams 20 are pivotally mounted on the tractor frame by means of the pivot shafts 176 affixed to the cams 20 and pivoted on the frames in any suitable manner, such as shown in the said patent. A link 177 is suitably connected to each of the two cams 20, and the link 177 is also pivotally connected at its upper end to the tie-bar 153. Accordingly, action of the cylinder 26 will cause pivot of the cams 20, about their pivot shafts 176 through linkage such as shown in the said patent, and the pivot action of the cams 20 will in turn displace the links 177 and thereby raise and lower the tie-bar 153. Up and down movement of the tie-bar 153 alters the tension in the springs 152 which are forcing downwardly on the three levers 139, as indicated in FIG. 6. This action normally causes the three levers 139 to have their connecting bolts 164 positioned in the lower end of the lost-motion slots 163. However, with the levers 104, 106, and 107 in the "off" or retracted position, the levers 139 position their respective spools in a neutral, rather than operating position relative to the function of the mower motors. Therefore, the mower motors will not operate until the levers 104, 106, or 107 are positioned forwardly, and thus the rods 169 and 173 are lock-out rods. Further, the lost-motion slots 163 and the connections shown and described therewith are such that when the mowers are in the raised position, and therefore the tie-bar 153 is elevated and there is no pulling force exerted by the springs 152 on the levers 139, then forward movement of the levers 104, 106, and 107 simply cause the connecting plate 162 to slide relative to the levers 139 and thus the mower motors cannot be positioned into the "on" mode and therefore will not operate, and this is a desirable and safety feature.

Another aspect relative to the operation of the mower motors with respect to the raised and lowered position of the mowers is seen with reference to FIG. 4. As previously described, spool 71 controls the lowering and raising of the mowers, and spool 71 is controlled by the foot pedals 109 and 111. The shown hydraulic arrangement is such that when the cylinders 26 and 27 have lowered the mowers, the spool 71 has then been positioned to where the spool passageway 89' is in flow communication with the port 88' and directs the flow to the port 178 which is in fluid-flow communication with the relief valve 87'. Therefore, when the cylinders 26 and 27 are fully stroked and create sufficient pressure in the attached hydraulic line, then there is sufficient pressure in the port 178 to trip the relief valve 87' and permit fluid to flow through the line 179 and to the port 84 and the connection 59. Thus if the operator held his foot on the lowering pedal beyond the time when the cylinders 26 and 27 ended their lowering stroking, the fluid pressure would pass to the connection 59, as described and it would then go to the line 181 and on to the reservoir 43. Also, when the operator releases the foot pedal for lowering, the spool 71 returns to the position shown in FIG. 4, and again the fluid pressure would pass through the port 88 to the port 84 and to the connection 59 and again through the line 181 and to the reservoir. However, if the operator had moved the spool 72, through its control lever 107, while the operator is depressing the lowering pedal and the mowers are still lowering, then there would be no fluid in the line 179 and therefore no fluid would be passing through the spool 72 and to the line 182 which connects to the motor 31. However, as soon as the mowers have been lowered, and that is when there is sufficient pressure in the line to actuate the relief valve 87', only then can there be a flow of fluid in the line 182 through the connection of the valve port 84 and the spool passageway 86 with the line 182. Therefore, again, there is an arrangement whereby the mower will not operate until the mower is lowered, and provision is made for this even though the operator has placed the spool 72 in the "on" position before the mowers are lowered. Also, the arrangement is such that if the operator retains his foot on the lowering pedal beyond the time when the mowers are fully lowered, this does not affect the operation of the lowering or of the running of the motor 31, once the lever 107 is placed in the "on" position. Of course it will be seen and understood that, in addition to what has been said with regard to the commencement of operation of the motor 31, the relief valve 87' is adjustable, by the adjustment spring 183, and this is all of a conventional nature, and therefore the timing between the lowering of the mowers and the commencement of the operation of the motor 31 can be set so that sufficient fluid pressure is created at the port 178 to open the relief valve 87' and thus permit flow of fluid to the line 182, upon shifting of the spool 72 as described. Therefore, the motor 31 can actually be operated at some time prior to its fully lowered position, depending upon the action of the adjustable relief valve 87'.

Also, the fluid line leading to the connection 91 could be provided with a restricted orifice designated 184, and thus the fluid passing to the connection 91 would be restricted in its flow and the lowering of the mowers would thereby be controlled and not fast to cause accidents or damage.

Further, the hydraulic arrangement shown in FIG. 4 is such that when the mower raising and lowering spool 71 is in its neutral position as shown in FIG. 4, then the fluid will pass from the pump 54 and to the port 88 and through the spool 71 and to the port 84 from where the fluid can be directed to the line 182, through the passageway 86 into spool 72, if desired.

Still further, the hydraulic arrangement is such that the sequence valve 42 will sense the pressure in the motor 31 when the spools 71 and 72 are in a set position, and the valve 42 will then open, and this can be utilized to have the mowers in a desired position before the motor 31 will be operating.

What is claimed is:

1. In a hydraulic system for a gang lawn mower of the type including a tractor, a traction hydraulic motor on said tractor for traction powering said tractor, a plurality of lawn mowers attached to said tractor and with each of said mowers including a grass cutter, a mower hydraulic motor on each of said mowers and operatively connected with said grass cutters for powering said grass cutters, a hydraulic pump on said tractor and being drivenly connected with said tractor to be powered thereby, a hydraulic valve on said tractor, a plurality of hydraulic lines interconnecting all said hydraulic motors and said pump and said valve, the improvement comprising said pump having a separate hydraulic pumping section respectively fluid-flow connected with each of said mower hydraulic motors and with said traction hydraulic motor, said valve having a plurality of separate sections respectively related to all said pump sections and having a plurality of fluid ports fluid-flow communicating all said valve sections with each other, a valve closure means movably disposed in each of said valve sections for controlling the flow of fluid through said valve fluid ports to thereby selectively block and open the flow of fluid to and from all said valve sections and said hydraulic lines, the ones of said valve closure means in the ones of said valve sections which are fluid-flow interconnected with said traction hydraulic motor, and also only one of said mower hydraulic motors, having fluid passageways in said ones of said valve closure means and being fluidflow communicable with said ports for fluidflow interconnecting those said ones of said valve sections for directing to said traction hydraulic motor all the fluid flow from the respective ones of said pump sections which are fluidflow connected with said ones of said valve sections, for transport drive of said tractor upon moving said ones of said valve closure means, and a single control assembly means operatively connected with said ones of said valve closure means for moving said ones of said valve closure means into the transport drive position by one movement of said control assembly.

2. The hydraulic system as claimed in claim 1, including another of said valve closure means in another of said valve sections which is fluid-flow interconnected with another of said mower hydraulic motors having a fluid passageway in said another valve closure means for fluid-flow interconnecting said another of said valve sections with said ones of said valve sections for directing to said traction hydraulic motor all the fluid flow from the respective one of said pump sections which are fluid-flow connected with said another and said ones of said valve sections, for transport drive of said tractor at a speed faster than that achieved through the subject matter of claim 1, and in response to moving said another of said valve closure means.

3. The hydraulic system as claimed in claim 1, including a hydraulic cylinder supported on said tractor and operatively connected to said lawn mowers for raising and lowering said lawn mowers upon extension and contraction of said hydraulic cylinder, said valve including a valve section and a valve closure for operating said hydraulic cylinder, a hydraulic line connected between said valve and said hydraulic cylinder, and an additional control connected with said valve closure means which is for operating said hydraulic cylinder.

4. The hydraulic system as claimed in claim 3, including an additional hydraulic cylinder supported on said tractor and operatively connected to one of said mowers, which is in addition to those said mowers operatively connected with the other said hydraulic cylinder, for raising and lowering said one of said mowers upon extension and contraction of said additional hydraulic cylinder, and a sequencing hydraulic valve operatively connected intermediate the two said hydraulic cylinders for sequentially directing the flow of fluid to said hydraulic cylinders for respectively sequentially raising and lowering said mowers.

5. The hydraulic system as claimed in claim 4, wherein said sequencing hydraulic valve includes a shiftable closure for controlling the flow of fluid between said hydraulic cylinders, an adjustable yieldable urging member operative on said shiftable closure for adjustably setting the hydraulic pressure at which said shiftable closure will shift for fluid flow therepast and to and from said hydraulic cylinders, and thereby adjustably set the timing of the sequential raising and lowering of said mowers.

6. The hydraulic system as claimed in claim 3, wherein said valve section for operating said hydraulic cylinder is the one of said valve sections for operating said mower hydraulic motors and is hydraulically connected to one of said pump sections which is fluid-flow connected with one of said mower hydraulic motors.

7. The hydraulic system as claim in claim 3, wherein said additional control is a foot pedal control mounted on said tractor for actuation of said hydraulic cylinder in the raising and lowering of said lawn mowers.

8. The hydraulic system as claimed in claim 7, including additional controls respectively operatively connected with each of said valve sections which are hydraulically connected with each of said mower hydraulic motors, for selective powering of each of said mower hydraulic motors.

9. The hydraulic system as claimed in claim 1, including additional controls respectively operatively connected with each of said valve sections which are hydraulically connected with each of said mower hydraulic motors, for selective powering of each of said mower hydraulic motors, a hydraulic cylinder supported on said tractor and operatively connected to said lawn mowers for raising and lowering said lawn moers upon extension and contraction of said hydraulic cylinder, said valve including an additional valve section and an additional valve closure means for operating said hydraulic cylinder, a hydraulic line connected between said valve and said hydraulic cylinder, an additional control connected with said additional valve closure means which is for operating said hydraulic cylinder, a lockout mechanism operatively interconnected between said single control assembly and all said additional controls for precluding actuation of all of said additional controls when said single control assembly is in the transport drive position, and for precluding actuation of said single control assembly into the transport drive position when said additional controls for said mower hydraulic motor are in positions for powering said mower hydraulic motor.

10. The hydraulic system as claimed in claim 9, wherein said additional control for operating said hydraulic cylinder is a foot pedal, and all the other said controls are levers which are operable by the operator's hand.

11. In a hydraulic system for a gang lawn mower of the type including a tractor, a traction hydraulic motor on said tractor for traction powering said tractor, a plurality of lawn mowers attached to said tractor and with each of said mowers including a grass cutter, a mower hydraulic motor on each of said mowers and operatively connected with said grass cutters for powering said grass cutters, a hydraulic pump on said tractor and being drivenly connected with said tractor to be powered thereby, a hydraulic valve on said tractor, a plurality of hydraulic lines interconnecting all said hydraulic motors and said pump and said valve, the improvement comprising controls operatively connected with said valve with respect to said traction hydraulic motor and said mower hydraulic motors, a lockout means operatively interconnectable between said controls for precluding certain actuation of said controls for said traction hydraulic motor to effect a transport mode of operation of said traction hydraulic motor when said mower hydraulic motors are operating, and for precluding actuation of said mower hydraulic motors when said traction hydraulic motor is in said transport mode of operation.

12. The hydraulic system as claimed in claim 11, wherein said controls and said lockout means include cams and cam followers operative on said valve, and including levers connected with said cams for positioning said cams in the actuation of said valve, and said cam followers being connected with said valve and positionable in the paths of said cams to preclude movement of said cams upon actuation of said levers.

13. The hydraulic system as claimed in claim 11, wherein some of said controls are hand manipulatable and the remainder of said controls are foot manipulatable.

14. In a hydraulic system for a gang lawn mower of the type including a tractor, a prime mover on said tractor, a plurality of lawn mowers pivotally supported on said tractor and with each of said mowers including a grass cutter, a mower hydraulic motor on each of said mowers and operatively connected with said grass cutters for powering said grass cutters, a hydraulic cylinder operatively associated with said mowers for pivoting said mowers between raised and lowered positions on said tractor, a hydraulic pump on said tractor and being drivenly connected with said prime mover to be powered thereby, a hydraulic valve on said tractor, a plurality of hydraulic lines interconnecting all said hydraulic motors and said cylinders and said pump and said valve, the improvement comprising a plurality of valve closure means included in said valve for respectively controlling the flow of fluid to said cylinders and said motors, two of said valve closure means being hydraulically interconnected and with one thereof controlling said cylinders and the other thereof controlling one of said mower motors, and an additional valve hydraulically connected intermediate said two valve closure means for controlling the flow of hydraulic fluid to said cylinders and said one motor.

15. the hydraulic system for a gang lawn mower as claimed in claim 14, wherein said additional valve is a pressure relief valve.

16. The hydraulic system for a gang lawn mower as claimed in claim 14, wherein said additional valve is a sequencing valve arranged to actuate said cylinders for lowering said mowers prior to passing fluid to said one motor for driving said cutter.

17. The hydraulic system for a gang lawn mower as claimed in claim 14, including a restricted orifice in said hydraulic line which leads to said cylinders for lowering said mowers, to thereby automatically slowly lower said mowers.

18. The hydraulic system for a gang lawn mower as claimed in claim 14, including one manually operable control member operatively connected with one of said two valve closure means, and another manually operable control member operatively connected with the other of said two valve closures, and said additional valve being adapted for sequentially supplying fluid to said two valve closure means in accordance with the pressure of the fluid at said additional valve, and thereby at times influence operation of said cylinders and said one motor regardless of the manipulation of the two said control members.

19. The hydraulic system for a gang lawn mower as claimed in claim 18, including a mower raising and lowering mechanism operatively connected with said cylinders, and a connector means operatively connected between said mechanism and said other valve closure means and being responsive to the raised and lowered positions of said mowers and thereby influence the hydraulically operative position of said other valve closure means for having said other valve closure means pass hydraulic fluid to said one motor only in accordance with the operation of said cylinders.

20. The hydraulic system for a gang lawn mower as claimed in claim 19, wherein said one manually operable control member is connected with said connector means for positioning said other valve closure means, and a lost-motion connection interposed between said one manually operable control member and said other valve closure means for resulting in movement of said one manually operable control member without movement of said other valve closure means.

* * * * *